Nov. 7, 1950     A. B. GREENFIELD     2,529,292
ELEVATING AND SUPPORTING APPARATUS
Filed May 21, 1948     2 Sheets-Sheet 1
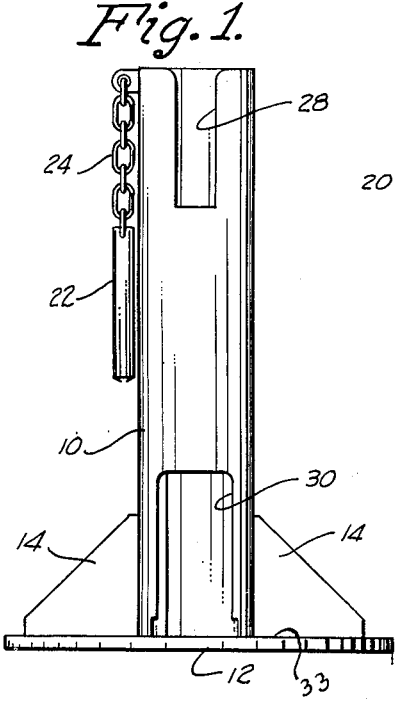
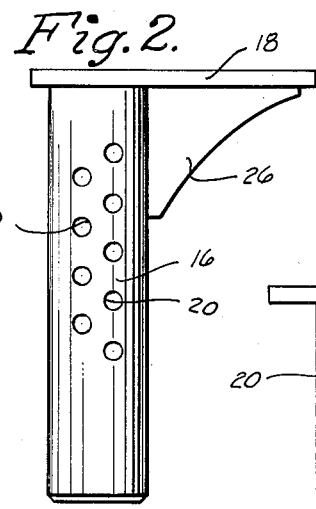
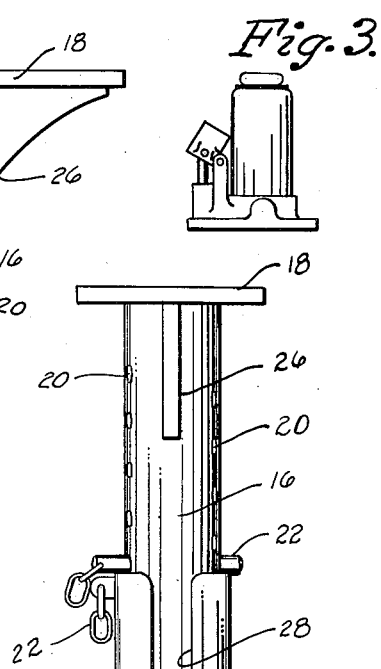
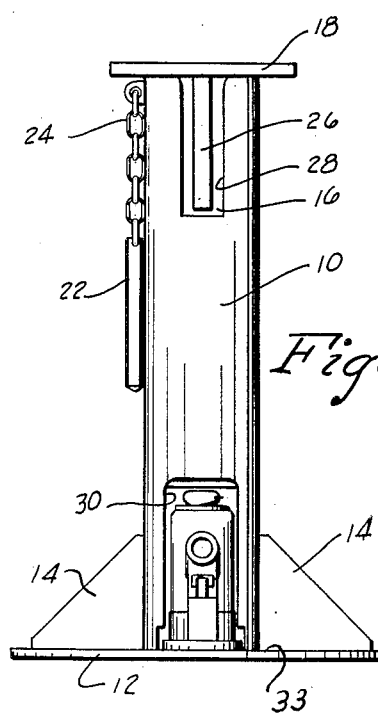
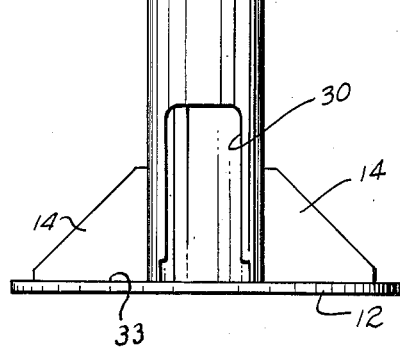
Albert B. Greenfield
INVENTOR.
BY Louis Necho
ATTORNEY Nov. 7, 1950 A. B. GREENFIELD 2,529,292
ELEVATING AND SUPPORTING APPARATUS
Filed May 21, 1948 2 Sheets-Sheet 2

Albert B. Greenfield.
INVENTOR.

BY Louis Necho
ATTORNEY

Patented Nov. 7, 1950

2,529,292

UNITED STATES PATENT OFFICE 2,529,292

ELEVATING AND SUPPORTING APPARATUS

Albert B. Greenfield, Philadelphia, Pa.

Application May 21, 1948, Serial No. 28,486

1 Claim. (Cl. 248—354)

My invention relates to an elevating and supporting apparatus of the type which is used for elevating a truck body, or the like, and for supporting it in elevated position.

One object of the invention is to produce an improved apparatus of the type set forth.

In transporting goods over highways, it is the practice to use large truck bodies which are detachably mounted on motor drawn chassis. When unloading a shipment, or when the truck body or the motor driven chassis needs servicing, it is the practice to place supports beneath the truck body and then to disconnect and remove the motor driven chassis.

It is therefore a further object of the invention to produce an improved elevating and supporting apparatus which is especially adapted for the purpose just above set forth.

Due to the height of the cab, and other practical considerations, the motor driven chassis, after being detached, is driven off in a forward direction and if the heavy truck body is supported only along its peripheral edges, so as to make room for the wheels of the chassis to pass between the supports, there is always danger that the truck body may slip or that the weight may be too much for the peripheral portions which rest on the support.

It is therefore a further object of the invention to produce an improved elevating and supporting apparatus which will provide adequate support and which will allow sufficient room for withdrawal of the chassis.

A still further object is to provide an improved apparatus which is strong, durable, adjustable, inexpensive, easy to manipulate and compact.

A still further object is to produce an apparatus of the type set forth wherein the jack used for lifting the body is, as soon as the lifting operation is completed, free and available for use elsewhere.

These and other objects are attained by my invention as set forth in the following specification and as illustrated in the accompanying drawings in which Fig. 1 is an elevational view of a base and sleeve member forming part of my invention.

Fig. 2 is an elevational view of a plunger member which is adapted to telescope within the sleeve of Fig. 1.

Fig. 3 is an elevational view of a conventional telescoping jack for raising the plunger of Fig. 2 relative to the base and sleeve of Fig. 1.

Fig. 4 is an elevational view showing the plunger of Fig. 2 fully nested within the sleeve of Fig. 1.

Fig. 5 is similar to Fig. 4 but showing the plunger of Fig. 2 raised with reference to the sleeve of Fig. 1.

The apparatus illustrated includes a sleeve or tubular member 10 which is supported by a base 12. The sleeve 10 and base 12 are preferably integral and the base 12 is of sufficient area to afford the requisite stability. Reenforcing webs 14 are provided at the junction of the sleeve and the base to afford the requisite strength.

Figure 6:
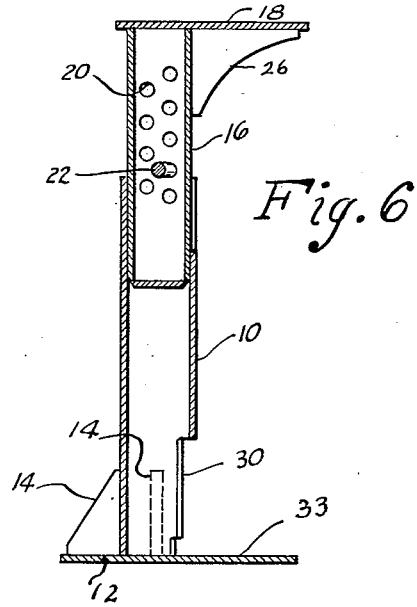
Fig. 6 is a vertical sectional view on line 6—6 on Fig. 5.

The invention also includes a plunger 16 which is adapted to telescope with the sleeve 10, as shown in Figs. 4, 5 and 6, and which is provided with an overhanging supporting head 18. The plunger 16 is provided with a plurality of vertically staggered holes 20 through which a pin 22 is adapted to be passed, as shown in Figs. 5 and 6. The pin 22 is preferably carried at the end of a chain 24 secured to the upper portion of the sleeve 10 as best shown in Fig. 1. The plunger 16 may be solid or tubular, it being merely necessary that it have the necessary strength. A reinforcing web 26 is provided at the junction of the plunger 16 and the supporting head 18 to reinforce the latter.

In order to reduce the overall height of the apparatus when it is in its fully collapsed condition, the upper portion of the sleeve 10 is provided with a slot 28 which accommodates the web 26 as shown in Fig. 4.

The lower portion of the sleeve 10 is provided with an opening 30 through which a conventional telescoping jack such as that shown in Fig. 3 may be inserted as shown in Fig. 4.

Figure 7:
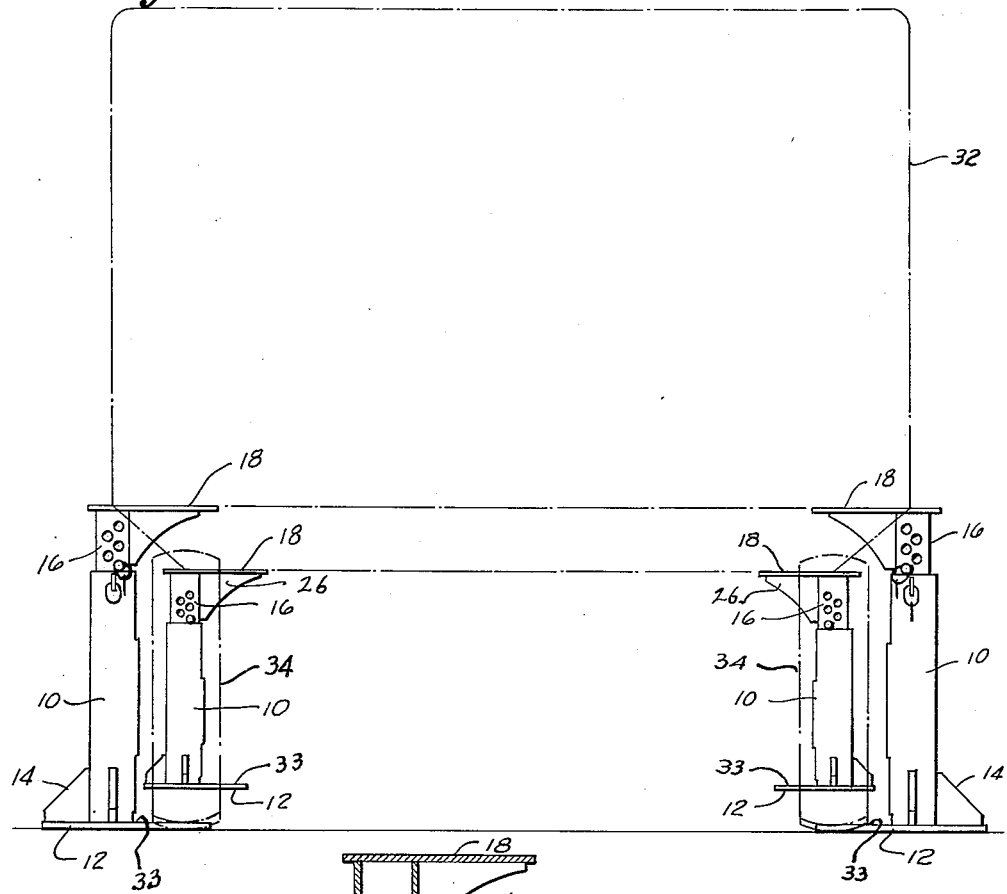
Fig. 7 is a diagrammatic view illustrating the manner in which the apparatus is used.

When the apparatus is to be used for elevating and supporting a truck body 32, the required number of devices, in the collapsed condition of Fig. 4, are placed under the body, as shown in Fig. 7. The number of supporting devices used depends upon the size and weight of the body. As shown, four elevating and supporting devices are used, one at each corner of the truck body. After the device is placed in position, the jack of Fig. 3 is inserted through the opening 30, is operated to raise the plunger 16 to the desired height and the pin 22 is inserted through the opening 20 which is nearest the upper edge of the sleeve 10 so as to support the plunger in its raised position and to permit removal of jack for use elsewhere.

It will be noted that the elevating and supporting devices are placed in such a way that the overhanging heads 18 thereof extend beneath the truck body as much as possible and that the outer walls of the truck body are close to or actually rest upon the outer portion of the head 18 which registers with the head of the plunger 16 as shown in Fig. 7. This provides a much stronger and a much more stable support. It will also be noted that the bottom reinforcing webs are all located on the outer or right hand portions of the bases 12 so as to leave the inner portions 33 of the bases free and unobstructed. This allows passage of the wheels 34 of the chassis over the inner portions 33 of the bases as shown in Fig. 7 and thus minimizes the space or distance between the supporting devices which are placed beneath the front corners of the truck body and between which the chassis is pulled out after the body 32 has been disconnected and has come to rest on the supporting devices.

It will be seen that I have produced an improved elevating and supporting apparatus which adequately supports the truck body while permitting the chassis to be removed; which permits removal of the jack for use elsewhere; which is compact and inexpensive to produce and which is easy to operate.

What I claim is:

An elevating and supporting apparatus comprising a pedestal including a flat, lateral extension, a tubular member secured to said pedestal adjacent said extension, a plunger slidable vertically in said tubular member, a platform carried by the upper end of the plunger and including a lateral overhanging portion, and a reinforcing and aligning web disposed between the underside of said overhanging portion and the upper end of said plunger, there being a slot in the upper end of said tubular member in alignment with said lateral extension for receiving said web when said plunger is moved downwardly relative to said tubular member, said tubular member having an opening in the lower end thereof for admission of a jack into said tubular member, the length of the plunger being less than the length of the tubular member whereby the jack can be inserted into the lower end of the tubular member when the plunger is in its lowermost position relative to said tubular member.

ALBERT B. GREENFIELD.

REFERENCES CITED

The following references are of record in the file of this patent:

UNITED STATES PATENTS

| Number | Name | Date |
|---|---|---|
| 1,264,261 | Blankenship | Apr. 30, 1918 |
| 1,343,274 | Mulvihill | June 15, 1920 |
| 1,499,280 | Alheit | June 24, 1924 |
| 1,524,913 | Dahl | Feb. 3, 1925 |
| 2,363,752 | Scott | Nov. 28, 1944 |